(12) United States Patent
Menke

(10) Patent No.: US 12,306,474 B2
(45) Date of Patent: *May 20, 2025

(54) SPECTACLE LENS FOR A DISPLAY DEVICE WHICH CAN BE PLACED ON THE HEAD OF A USER AND GENERATES AN IMAGE

(71) Applicant: tooz technologies GmbH, Aalen (DE)

(72) Inventor: Christoph Menke, Oberkochen (DE)

(73) Assignee: tooz technologies GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,658

(22) Filed: Nov. 8, 2023

(65) Prior Publication Data

US 2024/0069362 A1  Feb. 29, 2024

Related U.S. Application Data

(63) Continuation of application No. 17/513,848, filed on Oct. 28, 2021, now Pat. No. 11,841,558, which is a continuation of application No. 16/480,649, filed as application No. PCT/EP2018/050733 on Jan. 12, 2018, now Pat. No. 11,194,177.

(30) Foreign Application Priority Data

Jan. 25, 2017  (DE) .......................... 102017101352.0

(51) Int. Cl.
G02C 7/06  (2006.01)
G02B 27/01  (2006.01)
G02C 9/00  (2006.01)

(52) U.S. Cl.
CPC .......... G02C 7/061 (2013.01); G02B 27/0172 (2013.01); G02C 9/00 (2013.01); *G02B 2027/0178* (2013.01)

(58) Field of Classification Search
CPC .......... G02C 7/061; G02C 7/086; G02C 9/00; G02B 27/0172; G02B 2027/017
USPC ............................................................ 351/128
See application file for complete search history.

(56) References Cited

U.S. PATENT DOCUMENTS

2017/0184850 A1* 6/2017 Rudolph .............. G02B 27/017
2017/0351117 A1* 12/2017 Rousseau ............ G02B 6/0011
2018/0275405 A1* 9/2018 Dobschal ............... G02B 1/041

* cited by examiner

*Primary Examiner* — William R Alexander
(74) *Attorney, Agent, or Firm* — Skaar Ulbrich Macari, P.A.

(57) ABSTRACT

A spectacle lens for a display device which can be placed on the head of a user and generate an image has a front and a rear, an injection section and a deflection section spaced from the injection section, an exit section in the rear and a light-guiding channel which guides light beams of pixels of the generated image, which are injected into the spectacle lens via the injection section, in the spectacle lens to the deflection section, by which they are deflected towards the exit section and then coupled out of the spectacle lens through the exit section. The spectacle lens is in the form of a progressive lens having a distance vision region and a near vision region, and the exit section, as viewed from above onto the rear of the spectacle lens, lies outside the distance vision region and outside the near vision region.

10 Claims, 7 Drawing Sheets

SPECTACLE LENS FOR A DISPLAY DEVICE WHICH CAN BE PLACED ON THE HEAD OF A USER AND GENERATES AN IMAGE

PRIORITY

This application is a continuation of U.S. patent application Ser. No. 17/513,848, filed Oct. 28, 2021, which is a continuation of U.S. patent application Ser. No. 16/480,649, having a § 371(c) date of Jul. 24, 2019, which is a U.S. National Stage Application of PCT/EP2018/050733, filed on Jan. 12, 2018, now U.S. Pat. No. 11,194,177 B2, which claims the benefit of German Patent Application No. 102017101352.0 filed on Jan. 25, 2017, and wherein each of the foregoing applications is hereby incorporated herein by reference in its entirety.

FIELD

The present invention relates to a spectacle lens for a display device which can be placed on the head of a user and generates an image, to a display device having such a spectacle lens and to a method for producing such a spectacle lens.

BACKGROUND

Such spectacle lenses comprise a front side, a rear side, an input section, a deviating section separated from the input section, an exit section in the rear side, and a light guide channel which guides light beams from pixels of the generated image, which are input into the spectacle lens through the input section of the spectacle lens, in the spectacle lens as far as the deviating section, by which they are deviated in the direction of the exit section and are then output from the spectacle lens through the exit section.

Such a spectacle lens may be part of imaging optics of a display device which can be placed on the head of a user and generates an image, the imaging optics imaging the generated image in the worn state of the display device in such a way that the user can perceive it as a virtual image. The spectacle lens therefore contributes to the desired functionality of the overlay of the generated image into the field of view of the user.

SUMMARY

An object of the invention to refine a spectacle lens in such a way that it essentially provides the function of the image overlay for as many different users as possible.

Furthermore, a display device having such a spectacle lens, as well as a production method for such a spectacle lens, are intended to be provided.

By the configuration of the spectacle lens as a progressive power lens and the arrangement of the exit section outside the far-field region and outside the near-field region (as seen in a plan view of the rear side of the spectacle lens), the spectacle lens may be provided for users who require a progressive power lens. Since the exit section is arranged outside the far-field region and outside the near-field region, the region of the progressive power lens is in this case advantageously used which, during normal use of the progressive power lens, systematically (according to the so-called Minkwitz Theorem) has such high aberrations that these regions of the progressive power lens are not used, or are used only little, by the user when looking through the progressive power lens.

In the progressive power lens, the curvature (or the curvature profile) of the exit section may differ from the curvature (or the curvature profile) of an intermediate region of the rear side between the exit section and the near-field region in such a way that the ametropia correction when viewing the environment through the exit section is inferior than when viewing the environment through the intermediate region.

The transition from the exit section to the surrounding region of the rear side may be configured as a continuous and differentiable surface section. In particular, the entire rear side may be configured as a continuous and differentiable surface.

Furthermore, in the spectacle lens, the front side may be configured to be curved and the rear side may be configured to be curved.

The guiding of the light beams in the spectacle lens from the input section to the deviating section may be carried out by reflections (for example total internal reflections).

In the spectacle lens, the rear side may be configured as a freeform surface which carries out the desired ametropia correction.

Furthermore, the exit section may be spherically or aspherically curved. In particular, the exit section may be configured as a freeform surface.

The front side of the spectacle lens may be spherically curved.

The spectacle lens may also be configured in such a way that the front side is configured as a freeform surface for the ametropia correction and the rear side is spherically curved. The advantage achieved by this configuration is that the output of the light beams takes place through the rear side, and in particular through the exit section in the rear side, independently of the effect of the progressive power lens, since the ametropia correction is carried out by the front side configured as a freeform surface. Furthermore, it is possible to configure both the front side and the rear side respectively as a freeform surface, which together carry out the desired ametropia correction.

In the spectacle lens, the astigmatism in the exit section may be at least 1 diopter, and in particular at least 2 diopters.

Furthermore, in the spectacle lens, the astigmatism in the near-field region may be not more than 1 diopter, and in particular not more than 0.5 diopters.

In the spectacle lens, the far-field region and the near-field region, as seen in a plan view of the rear side of the spectacle lens, may together be configured in a T-shape. In particular, the far-field region may lie above the near-field region. The exit section may be arranged on the right or left next to the near-field region.

The spectacle lens may be configured as a single-sheet, double-sheet or multisheet spectacle lens. In order to guide the light beams in the spectacle lens, reflections may take place on the front and/or rear side. It is, however, also possible for one or more reflective or semireflective layers to be provided on the front and/or rear side or inside the spectacle lens in order to guide the light beams.

The deviating section may comprise a reflective or semireflective deviating surface. It is furthermore possible that the deviating section may comprise a plurality of reflective or semireflective deviating surfaces arranged next to one another. The deviating section may be configured in such a way that it carries out pure beam deflection. It is, however, also possible for the deviating section additionally to have an imaging property. This may be achieved by a corresponding arrangement of the deviating surfaces (which may also be referred to as facets). In addition or as an alternative, it may be achieved by a curvature profile of the deviating surfaces or of the single deviating surface.

The reflective or semireflective facets may be arranged offset with respect to one another in the manner of a zigzag line or a sawtooth line.

The deviating surface or the deviating surfaces preferably do not extend over the entire thickness (extent from the front side to the rear side) of the spectacle lens, but only over a part thereof. In particular, the deviating surface/deviating surfaces may be configured as a buried deviating surface/ deviating surfaces, which extend precisely as far as the front side or not as far as the front side. The depressions possibly existing because of the deviating surfaces may be configured in such a way that there is a continuous front side.

Furthermore provided is a display device having a holding device which can be placed on the head of a user, an image generation module, which is fastened on the holding device, and imaging optics which are fastened on the holding device and which comprise a spectacle lens according to the disclosure and image the generated image in the state of the holding device placed on the head of the user, so that the user can perceive it as a virtual image.

The imaging optics may comprise the spectacle lens as the only optical element. It is, however, also possible for the imaging optics to also comprise at least one further optical element besides the spectacle lens. The at least one further optical element may be separated from the spectacle lens or connected thereto. It is furthermore possible for the at least one further optical element to be configured in one piece with the spectacle lens.

The display device may comprise a control unit which controls the image generation module.

The image generation module may in particular comprise a flat image generator, such as for example an LCD module, an LCoS module, an OLED module or an adjustable-mirror matrix. The image generator may comprise a multiplicity of pixels, which may for example be arranged in rows and columns. The image generator may be self-illuminating or not self-illuminating.

The image generation module may, in particular, be configured in such a way that it generates a monochromatic or a polychromatic image.

The display device may comprise further elements, known to the person skilled in the art, which are required for the operation of the display device.

Furthermore provided is a method for producing a spectacle lens, wherein different ametropia ranges, which are respectively determined by a range of the aberrations to be corrected, are established, for each ametropia range, a curvature profile of the exit section is calculated and this exit section is assigned to the ametropia range, the ametropia range in which the aberration value of the spectacle lens to be produced lies is determined, the curvature profile of the rear side of the spectacle lens to be produced is calculated in such a way that the exit section assigned to the ametropia range determined is selected and its curvature profile is kept constant and not changed during the calculation of the curvature profile of the rear side, and the spectacle lens is produced on the basis of the calculated curvature profile of the rear side.

The aberration to be corrected may, for example, be the spherical aberration. The ametropia ranges may then, for example, extend over ±2 diopters, 1 diopter or ±0.5 diopters. It is therefore possible, for example, to subdivide ametropias from the range of −10 to +10 diopters into 5, 10 or 20 ametropia ranges, and for each of these ametropia ranges to calculate precisely one curvature profile for the exit section and to assign this to the ametropia range. It is therefore necessary to calculate only 5, 10 or 20 curvature profiles for the exit section. This may be carried out once, and then the calculated curvature profiles may be used for the exit section for the individual configuration of a spectacle lens. This significantly facilitates the production of a progressive power lens for a user. It has been found that outstanding imaging properties for the representation of the virtual image may be achieved with this procedure.

The aberration to be corrected may be a single aberration (such as for example the spherical aberration) or also a plurality of different aberrations.

The method for producing a spectacle lens may be refined in such a way that the spectacle lens (including its refinements) can be produced.

It is to be understood that the features mentioned above and those yet to be explained below may be used not only in the combinations specified but also in other combinations or individually, without departing from the scope of the present invention.

BRIEF DESCRIPTION OF THE DRAWINGS

The invention will be explained in yet more detail below by way of example with the aid of the appended drawings, which also disclose features essential to the invention.

Figure 1:
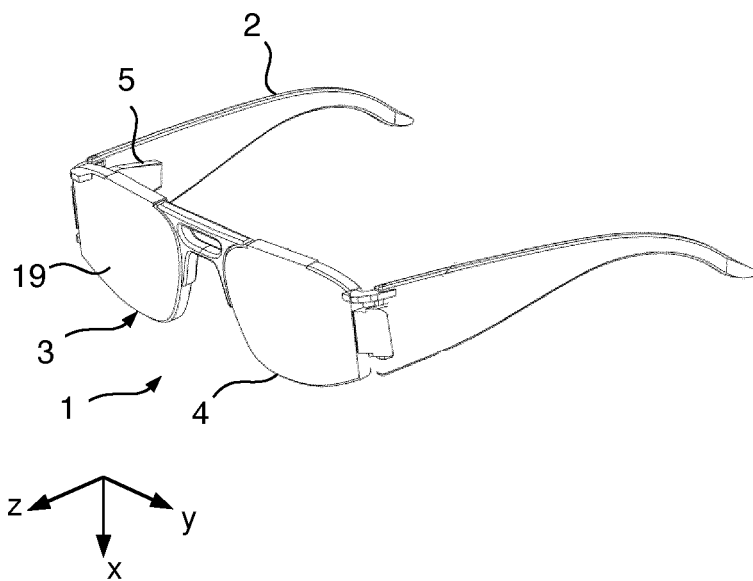
FIG. 1 shows a schematic perspective representation of one embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the example embodiment shown in FIG. 1, the display device 1 comprises a holding device 2, which can be placed on the head of a user and which may for example be configured in the manner of a conventional spectacle frame, as well as a first and a second spectacle lens 3, 4, which are fastened on the holding device 2. The holding device 2 with the spectacle lenses 3 and 4 is configured as a progressive power lens for the correction of an ametropia, wherein the user may have a virtual image overlaid into his or her field of view through the first spectacle lens 3, as will be described below.

To this end, the display device 1 comprises an image generation module 5, which may be arranged in the region of the right spectacle frame arm 2, as is schematically illustrated in FIG. 1. The image generation module 5 may comprise a flat image generation element 6 (FIG. 2), such as for example an OLED, a CMOS or an LCoS chip, or an adjustable-mirror matrix, having a multiplicity of pixels arranged in columns and rows for example.

The spectacle lenses 3 and 4, and in particular the first spectacle lens 3, are described only by way of example together with the display device 1 according to the invention. The spectacle lenses 3, 4, or at least the first spectacle lens 3, are respectively configured per se as a spectacle lens 3, 4 according to the invention.

Figure 2:
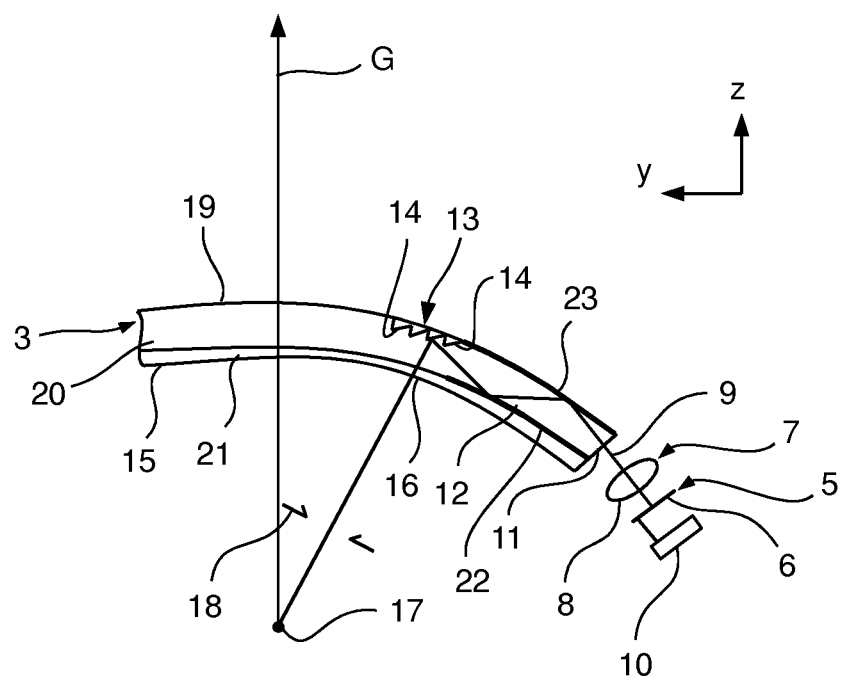
FIG. 2 shows an enlarged partial sectional view of the first spectacle lens, including a schematic representation of the image generation module.

As can be seen best from the enlarged schematic partial sectional view in FIG. 2, the display device 1 comprises imaging optics 7, which contain an optical element 8 arranged between the image generation element 6, or the image generator 6, and the first spectacle lens 3. Furthermore, the first spectacle lens 3 itself is also used as part of the imaging optics 7.

A light beam 9 may originate from each pixel of the image generator 6. By corresponding control of the pixels of the image generator 6 by means of a control unit 10, which may be part of the image generation module 5, the desired image may be generated. In FIG. 2, to represent the light beams 9, the ray path of a light ray is indicated, so that the discussion below also relates to the light ray 9.

The light ray 9 originating from the image generator 6 passes through the optical element 8 and, through an input section 11 (in this case the end side of the first spectacle lens 3), enters the first spectacle lens 3 and is guided in the latter along a light guide channel 12 as far as a deviating section 13. The deviating section 13 in this case comprises a plurality of semireflective deviating surfaces 14 (which may also be referred to as semireflective facets) arranged next to one another, at which reflection of the light rays 9 in the direction of a rear side 15 of the first spectacle lens 3 takes place, so that the light rays 9 emerge from the first spectacle lens 3 through an exit section 16 of the rear side 15. A user, when he or she is correctly wearing the display device 1 according to the invention, can therefore perceive the image generated by means of the image generator 6 as a virtual image when he or she looks at the deviating section 13. In FIG. 2, the rotation point 17 of the user's eye as well as the eyebox 18 or the exit pupil 18 of the imaging optics 7 are indicated for illustration. The eyebox 18 is the region in which the user's eye can move and he or she can still perceive the generated image as a virtual image.

Although, in the exemplary embodiment described, the input is carried out into the end side of the first spectacle lens 3 and the input section 11 is therefore formed on the end side of the first spectacle lens 3, it is also possible to carry out input through the rear side 15 of the first spectacle lens 3.

As is shown in the schematic representation of FIG. 2, the rear side 15 and a front side 19 of the first spectacle lens 3 are respectively configured to be curved. The first spectacle lens 3 is furthermore configured in two sheets, and comprises an outer sheet 20 as well as an inner sheet 21. The side of the outer sheet 20 facing away from the inner sheet 21 forms the curved front side 19 of the first spectacle lens 3, and the side of the inner sheet 21 facing away from the outer sheet 20 forms the rear side 15 of the first spectacle lens 3.

In order to form the light guide channel 12, a first reflection surface 22 is formed between the outer and inner sheets 20, 21, which surface extends from the input section 11 as far as the deviating section 13. Furthermore, a second reflection surface 23, which lies opposite the first reflection surface 22 and in turn extends from the input section 11 as far as the deviating section 13, may be formed on the front side 19. The two reflection surfaces 22 and 23 are preferably configured to be semireflective. The light beams input through the input section 11 can therefore be guided in the light guide channel 12 by reflections on the reflection surfaces 22 and 23 from the input section 11 as far as the deviating section 13. The second reflection surface 23 may also be omitted. In this case, total internal reflection of the light beams 9 preferably takes place on the front side 19 in the region of the light guide channel 12, in order to ensure the desired guiding of the light beams in the light guide channel 12.

Figure 3:
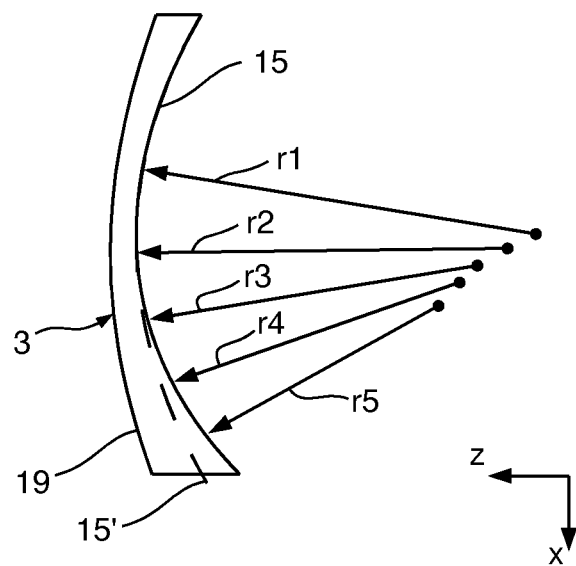
FIG. 3 shows a schematic sectional view of the first spectacle lens.

FIG. 3 shows a schematic sectional view of the z-x plane of the first spectacle lens 3, which is configured as a progressive power lens. The front side 19 is in this case spherically curved, and the rear side 15 has an aspherical curvature with an increasing curvature in the x direction (and therefore with decreasing radii of curvature r1, r2, r3, r4, r5 in the x direction), so that the upper region is corrected for far-field vision and the lower region is corrected for near-field vision. For illustration, the curvature profile with a constant radius of curvature r1 is indicated by dashed lines, which is denoted by the reference number 15'.

The radius of curvature r1 therefore denotes the curvature for far-field vision. The radius of curvature r5 denotes the radius of curvature for near-field vision, and the radii of curvature r2-r4 are the radii of curvature in the transition region between far-field vision and near-field vision. The first spectacle lens therefore has a smooth (i.e. stepless) diopter number transition between the (upper) far-field part and the (lower) near-field part. The required greater curvature of the first spectacle lens 3 in the lower region leads to astigmatic errors in the transition zone in the lateral field of view. This effect is often also referred to as the Minkwitz Theorem.

Figure 4:
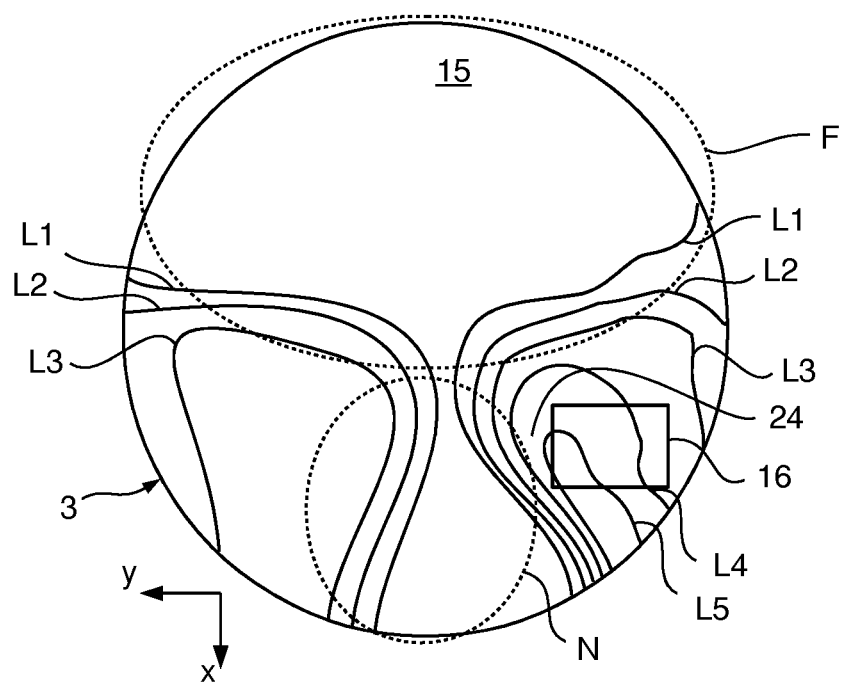
FIG. 4 shows a plan view of the rear side 15 of the first spectacle lens.

This astigmatic error is represented schematically in the schematic plan view of the rear side 15 in FIG. 4 in the form of contour lines for equal astigmatic error. The lines L1, L2, L3, L4 and L5 in this case correspond to an astigmatic error of 0, 1, 2, 3 and 4 diopters, respectively. For example, the astigmatic error for the line L3 is therefore 2 diopters. The astigmatic error is in this case intended to mean the magnitude of the difference of the refractive power in the y direction and the refractive power in the x direction.

The progressive power lens 3 therefore comprises an upper far-field region F for far-field vision and a lower near-field region N for near-field vision, the near-field region N having a much smaller extent in the y direction than the far-field region F because of the unavoidable astigmatic error in the lateral field of view (Minkwitz Theorem). The far-field region F and the near-field region N therefore together form a T-shape in a plan view of the rear side 15.

The first spectacle lens 3 is now configured in such a way that the exit section 16 (as seen in the representation of FIG. 4) lies at the lower right, so that a user, when the display device is worn, must look down to the right relative to the straight-ahead view G (FIG. 2) in order to be able to perceive the generated image as a virtual image. So that the image representation can be generated as far as possible without astigmatic errors (which occur precisely in this region of the progressive power lens 3 on the aspherical rear side 15), the curvature profile of the rear side 15 in the exit section 16 is other than or different to the curvature profile of the environment of the rear side 15 immediately adjacent to the exit section 16. In particular, the entire imaging optics 7, and therefore also the curvature of the exit section 16, are configured in such a way that maximally distortion-free imaging takes place. This may, for example, have the effect that there is inferior ametropia correction when viewing the environment through the exit section 16, when no image is generated and imaged as a virtual image, in comparison with the case in which there is no special adaptation of the curvature of the exit section 16. It may also be stated that the ametropia correction when viewing the environment is inferior than when viewing the environment through a section 24 which lies between the exit section 16 and the near-field region N.

Figure 5:
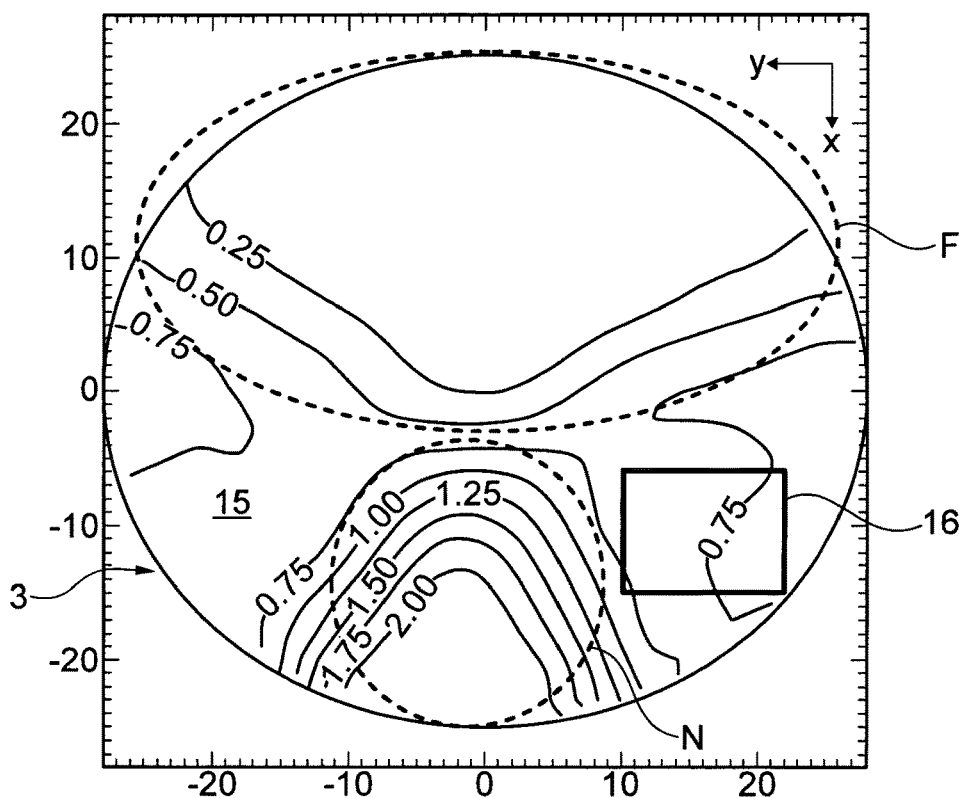
FIG. 5 shows a plan view of the rear side of a further embodiment of the first spectacle lens with contour lines for the spherical aberration.
Figure 6:
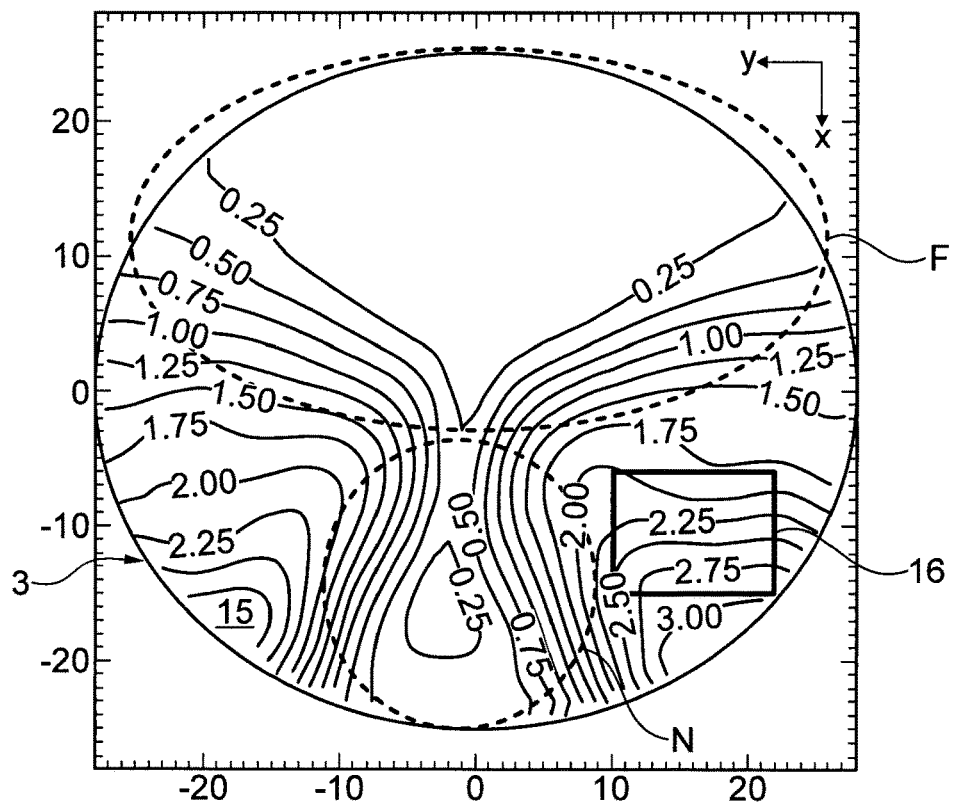
FIG. 6 shows a plan view of the rear side of the first spectacle lens 3 according to FIG. 5 with astigmatism contour lines.

The rear side of one embodiment of the progressive power lens 3 according to the invention is shown in a plan view in FIG. 5, the refractive power (spherical effect) being represented in diopters by contour lines. The dimensions in the x and y directions are specified in millimeters. The progressive power lens is configured for a user who requires no correction for far-field vision and a correction of +2 diopters for near-field vision. A plan view of the rear side 15 of the spectacle lens of FIG. 5 is shown in FIG. 6 in the same way as in FIG. 5, contour lines for the astigmatism of the progressive power lens 3 being indicated in FIG. 6. As can be seen from the representations in FIGS. 5 and 6, the exit section 16 lies outside the far-field region F and outside the near-field region N in the lower lateral (in this case right) field of view. In this region, there is a low refractive power (here a range of 0.75 diopters) and a large astigmatism (here in the range of ≥2). However, the curvature profile of the exit section 16 is configured in such a way that good and therefore maximally error-free perception of the generated image as a virtual image is possible.

Figure 7:
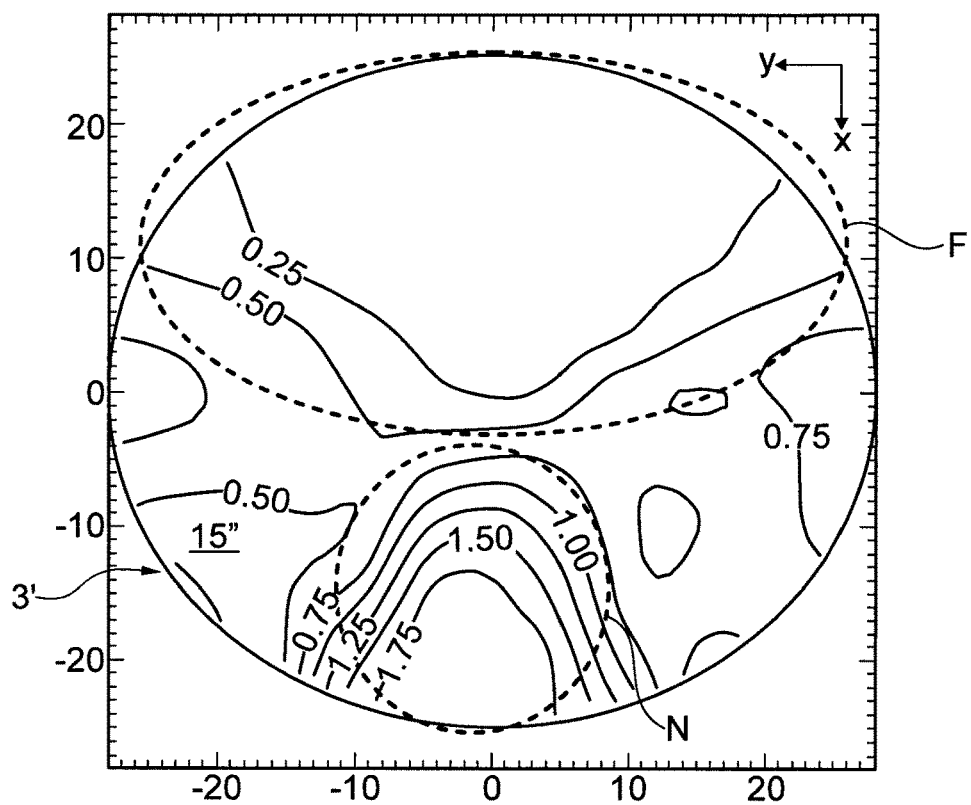
FIG. 7 shows a plan view of the rear side of a conventional first spectacle lens in the same way as in FIG. 5.
Figure 8:
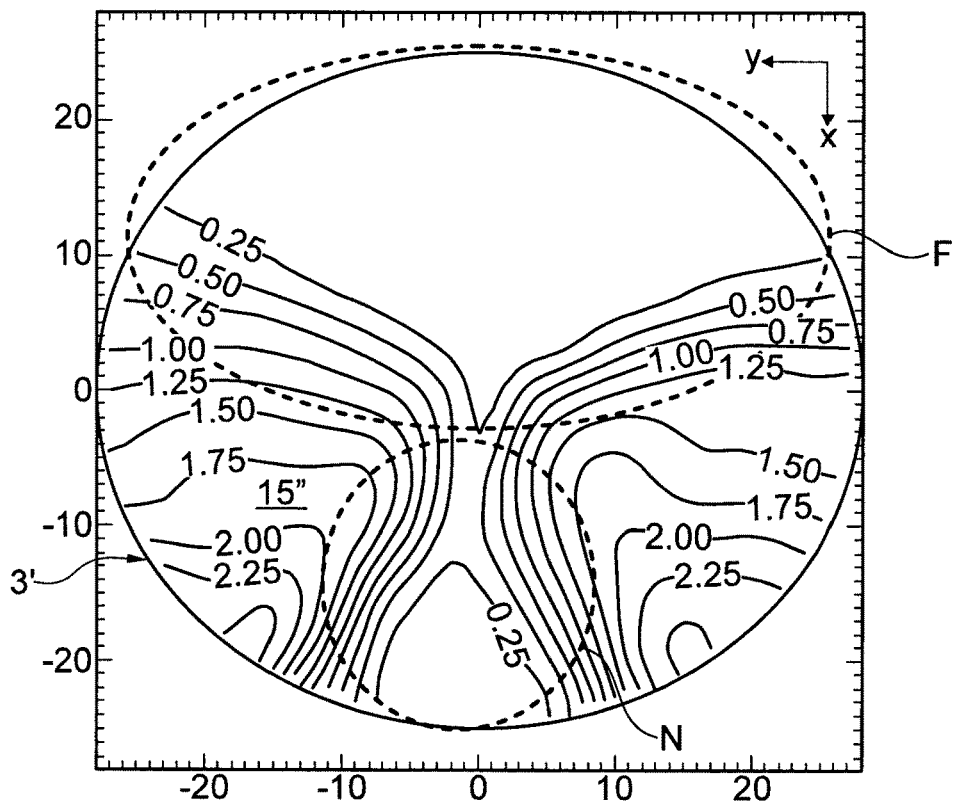
FIG. 8 shows a plan view of the rear side of a conventional spectacle lens in the same way as in FIG. 6.

A conventional progressive power lens 3' is shown in FIGS. 7 and 8 in the same way as in FIGS. 5 and 6. Thus, the refractive power (spherical effect) in diopters is shown in a plan view of the rear side 15" in FIG. 7 and the astigmatism is shown in FIG. 8, for a spectacle lens which is intended to have no correction in the far-field region F and a correction of +2 diopters in the near-field region N. As a comparison of FIGS. 7 and 8 with FIGS. 5 and 6 shows, in the conventional spectacle lens 3' there is a lower astigmatism in the lower right field of view than in the comparable region (exit section 16) of the spectacle lens 3 according to the invention according to FIG. 6. This shows that the spectacle lens 3 according to the invention has inferior properties for looking through in the right lower field of view than a conventional progressive power lens 3' for the same user with the same parameters (thus in this case a far-field region F without ametropia correction and a near-field region N with an ametropia correction of +2 diopters). Yet since this lower right field of view region is systematically not usable for the use, this quality reduction when looking through is not a disadvantage. On the contrary, advantageously this actually unused region of the progressive power lens 3 is now advantageously used for the generation of the desired virtual image.

The curvature of the exit section 16 may, for example, be spherical or aspherical. Preferably, the transition between the exit section 16 and the immediately adjacent region of the rear side 15 (for example section 24) is configured in such a way that it is continuous and differentiable. In particular, preferably the entire rear side 15 is configured as a continuous and differentiable surface.

In the exemplary embodiment described here, the inner sheet 21, or the curvature profile of the rear side 15, is used as a correction surface which provides the desired progressive power functionality.

Figure 9:
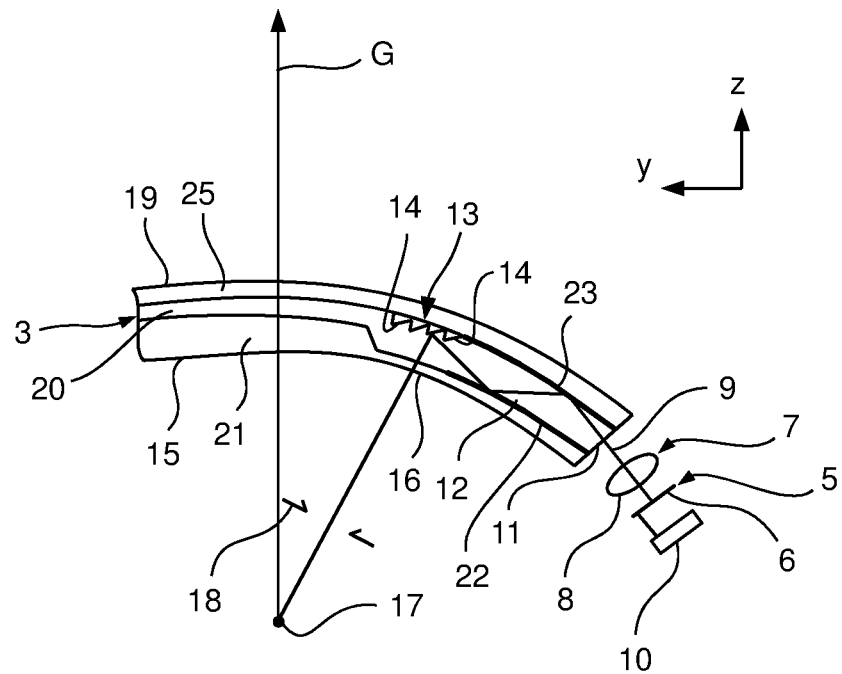
FIGS. 9 to 11 show enlarged partial sectional views of further embodiments of a first spectacle lens according to the invention, including a schematic representation of the image generation module.

The first spectacle lens 3 may also be configured in three sheets, as is schematically represented in FIG. 9. The representation of FIG. 9 corresponds to that of FIG. 2, and elements which are the same are denoted by the same references. As is shown in FIG. 9, arranged on the outer sheet 20 there is a second outer sheet 25, which is connected (for example adhesively bonded) to the outer sheet 20. The side of the second outer sheet 25 facing away from the inner sheet 21 forms the front side.

In the embodiment described here, the outer sheet 20, which in the three-sheet structure may also be referred to as a channel sheet 24, is thicker in the region of the light guide channel 12 than in the remaining region. Naturally, the channel sheet 20 may also be configured with a constant thickness. Furthermore, the channel sheet 20 extends over the entire first spectacle lens 3 and may therefore also be referred to as spacer sheet 20, since it always lies between the inner sheet 21 and the second outer sheet 25, so that the second outer sheet 25 is never in direct contact with the inner sheet 21.

Figure 10:
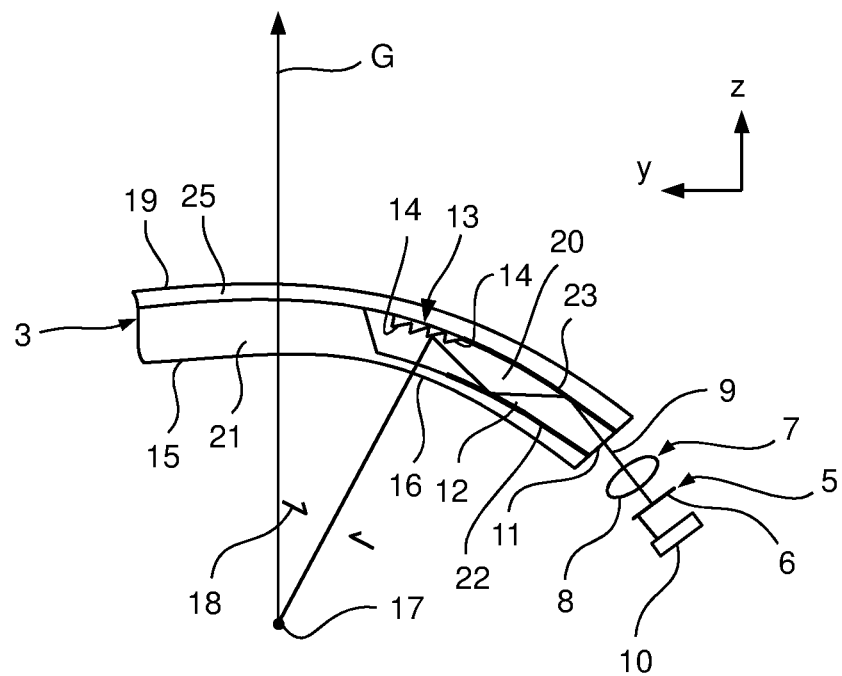

It is, however, also possible that the channel sheet 20 does not extend over the entire first spectacle lens 3. In particular, the channel sheet 20 may extend only in the region of the light guide channel 12. In this case, in the other regions in which the channel sheet 20 is not present, there may be direct contact between the inner sheet 21 and the second outer sheet 25, as is schematically represented in FIG. 10.

Figure 11:
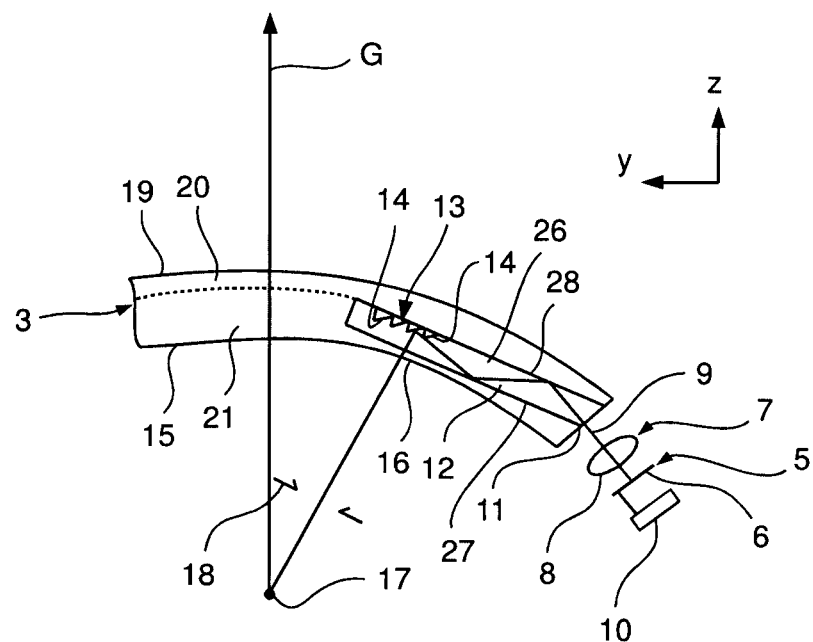

A further embodiment, in which the light guide channel 12 in the first spectacle lens 3 is formed by a plane-parallel channel plate 26, is shown in FIG. 11. The reflections for light guiding of the light rays 9 then take place on the two side surfaces 27 and 28 of the channel plate 26. This may be achieved by a corresponding reflection layer on the side surfaces 27, 28. It is furthermore possible to arrange the channel plate 26 in the spectacle lens 3 in such a way that there is a small air gap between the side surfaces 27 and 28 and the rest of the spectacle lens 3, so that light guiding by total internal reflection on the side surfaces 27 and 28 is provided. The spectacle lens 3 may in this case be configured with a single sheet, or also at least two sheets, as is indicated by the dashed line 29.

Figure 12:
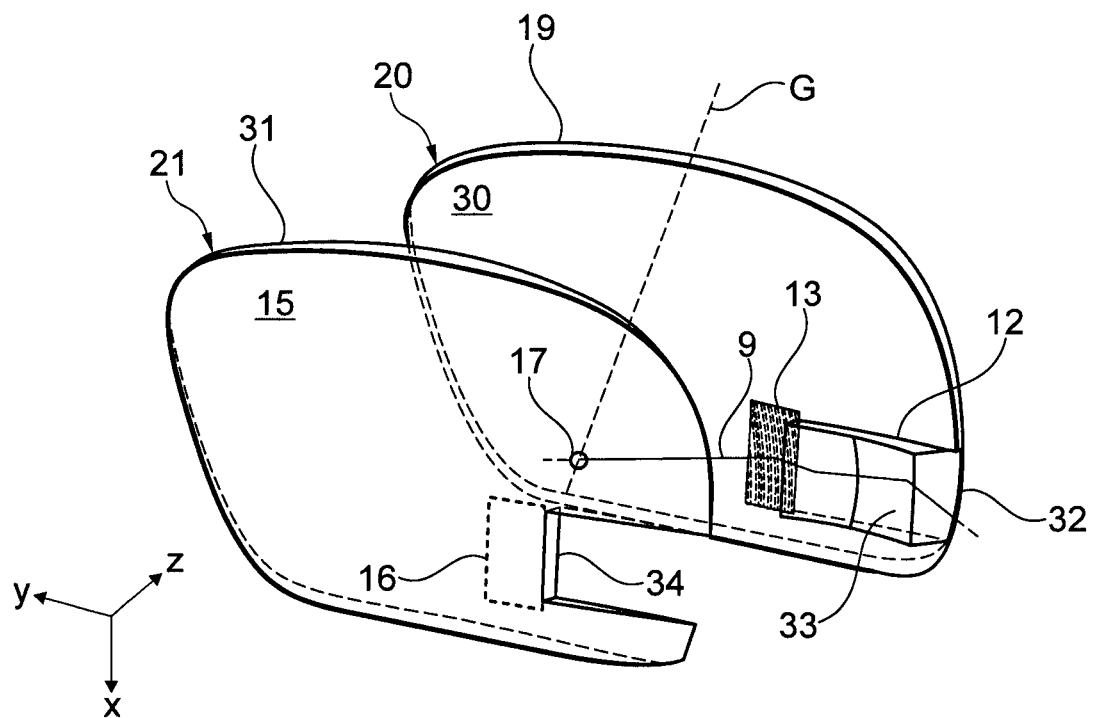
FIG. 12 shows a perspective exploded representation of an in a further embodiment of the first spectacle lens according to the invention.
Figure 13:
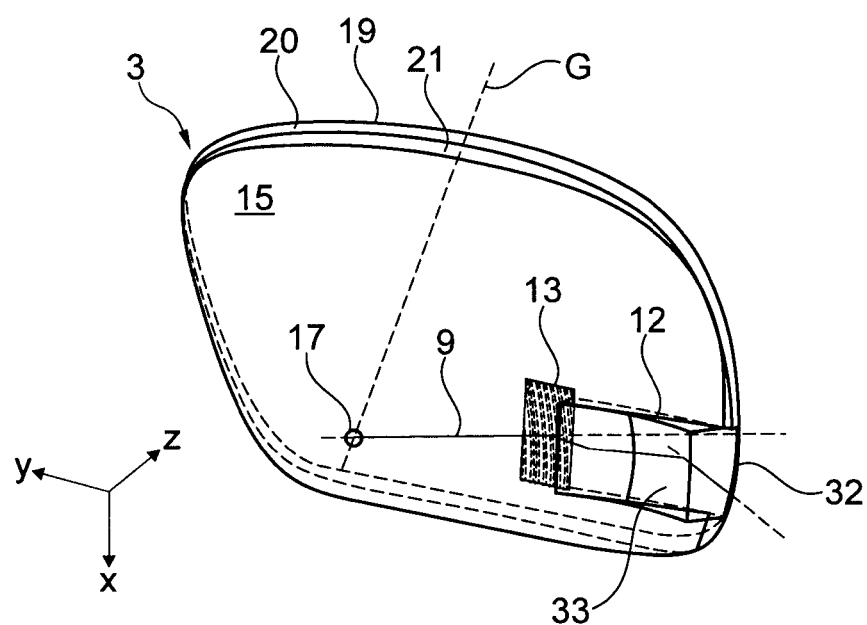
FIG. 13 shows a perspective representation of the first spectacle lens according to the invention according to FIG. 12.

A further embodiment of the spectacle lens 3 according to the invention are shown in FIGS. 12 and 13, FIG. 12 being a perspective exploded representation and FIG. 13 being a perspective representation. As can be seen from FIGS. 12 and 13, there is a two-sheet configuration of the spectacle lens 3, the mutually facing sides 30 and 31 of the outer and inner sheets 20, 21 having complementary curvatures, so that they can be connected flatly to one another.

The light guide channel 12 is essentially formed on the inner side 30 of the outer sheet 20. In this case, the light guiding may, for example, take place by total internal reflection on the interfaces 32, 33 of the light guide channel 12 which lie opposite one another in the z direction. Naturally, it is also possible for a reflective coating, which carries out the desired reflection of the light rays 9, to be formed on the interface 32 and/or on the interface 26. The reflectivity of the relative coating may, for example, be as high as possible (about 100%) or less. The reflective coating may therefore be configured as a mirror layer or as a semireflective layer.

In the embodiment described here, the interface 32 is part of the front side 19 of the outer sheet 20. The interface 33 is not, however, part of the side 30 of the outer sheet 20 facing toward the inner sheet 21 but a separately formed interface which, besides the light guiding, may also provide an optically imaging property, for example in order to reduce imaging errors. The light guide channel 12 therefore protrudes relative to the side 30 of the outer sheet 20, and therefore has a greater thickness than the outer sheet 20 in the z direction.

In order nevertheless to be able to provide a first spectacle lens 3 which is thin overall, the inner sheet 21 comprises a recess 34 which extends from the side 31 of the inner sheet 21 in the direction of the rear side 15. In the exemplary embodiment described here, the recess extends over the entire thickness (extent in the z direction) of the inner sheet 21. The recess 34 is dimensioned in such a way that, in the assembled state, the light guide channel 12 is seated in it and the deviating section 13 lies next to the recess 34, and therefore in front of the side 31 of the inner sheet 21. The exit section 16 therefore lies directly next to the recess 34, as is indicated in FIG. 12.

Figure 14:
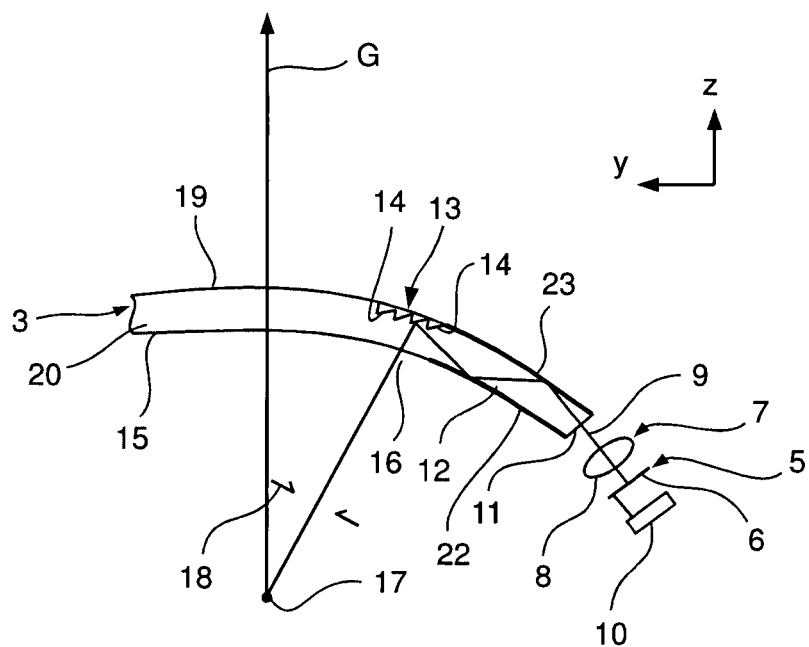
FIG. 14 shows an enlarged partial sectional view of a further embodiment of the first spectacle lens according to the invention, including a schematic representation of the image generation module.

The further embodiment of the display device 1 according to the invention shown in FIG. 14 differs from the embodiment according to FIG. 2 in that the spectacle lens 3 is configured as a single-sheet spectacle lens 3, only the outer sheet 20 being provided. Since elements which are the same are denoted by the same reference numbers, reference may be made to the embodiments above for their description. The first reflection surface 22 and/or the second reflection surface 23 may also be omitted. In this case, the required reflection for guiding the light radiation 9 is achieved by total internal reflection.

In the display device 1 according to the invention, the overlay of the virtual image into the field of view of the user takes place through the first spectacle lens 3. Naturally, an overlay through the second spectacle lens 4 is also possible. Furthermore, the display device 1 may be configured in such a way that the virtual image is overlaid through both spectacle lenses 3, 4. In this case, the overlay may be carried out in such a way that a three-dimensional image impression is formed. This, however, is not absolutely necessary.

The holding device 2 need not be configured as a spectacle-like holding device 2. Any other type of holding device 2, with which placement and wearing of the display device 1 on the head may be carried out, is also possible.

Since different ametropias occur in practice, the curvature of the rear side 15 may, for example, be individually adapted in such a way that ametropias from the range of −10 to +10 diopters can be corrected. Since the imaging optics 7 of the data channel also need to be adapted to the individual ametropia, the curvature of the exit section 16 would also need to be adapted for each ametropia. An individual data channel (imaging optics 7) would therefore be configured for each ametropia. This, however, would be a very high outlay. Advantageously, therefore, the data channel may be configured for a predetermined ametropia range. For example, the diopter range of −10 diopters to +10 diopters may thus be subdivided into 5, 10 or 20 ranges, which then respectively cover an extent of ±2 diopters, ±1 diopter or ±0.5 diopters. Therefore, 5, 10 or 20 individually configured and already precalculated data channels are provided, for which all the dimensions and curvatures are already specified. The curvature of the exit section 16 is also already specified. During the configuration of the curvature of the inner side 15 in the remaining region, the curvature of the exit section 16 is then kept constant and not changed. An individually adapted progressive power lens 3, which furthermore also provides an outstanding imaging property for the represented virtual image, or for the data overlay, may therefore be produced in a straightforward way.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A spectacle lens for a display device which can be placed on the head of a user and that generates an image, the spectacle lens comprising:
   a front side and a rear side;
   an input section;
   a deviating section separated from the input section;
   an exit section in the rear side; and
   a light guide channel,
   wherein the light guiding channel guides light beams from pixels of the image that is generated,
   wherein the light beams from the pixels are input into the spectacle lens through the input section and travel through the spectacle lens as far as the deviating section,
   wherein at the deviating section the light beams from the pixels are deviated in the direction of the exit section and are then output from the spectacle lens through the exit section,
   wherein the spectacle lens is configured as a progressive power lens with a far-field region and a near-field region,
   wherein the exit section, as seen in a plan view of the rear side of the spectacle lens, lies outside the far-field region and outside the near-field region,
   wherein the front side is curved and is configured as a freeform surface to correct ametropia of the user.

2. The spectacle lens as claimed in claim 1, wherein the exit section has a curvature that differs from a curvature of an intermediate region of the rear side between the exit section and the near-field region in such a way that an ametropia correction when viewing an environment through the exit section is inferior than when viewing the environment through the intermediate region.

3. The spectacle lens as claimed in claim 1, wherein the rear side is entire configured as a continuous and differentiable surface.

4. The spectacle lens as claimed in claim 1, wherein the exit section is spherically curved.

5. The spectacle lens as claimed in claim 1, wherein the exit section is aspherically curved.

6. The spectacle lens as claimed in claim 1 wherein an astigmatism in the exit section is more than 1 diopter or more than 2 diopters.

7. The spectacle lens as claimed in claim 1, wherein an astigmatism in the near-field region is not more than 1 diopter or not more than 0.5 diopters.

8. The spectacle lens as claimed in claim 1, wherein the rear side is curved such that the output of the light beams takes place independently of the effect of the progressive power lens.

9. A display device, comprising:
a holding device which can be placed on the head of a user;
an image generation module, which is fastened on the holding device; and
imaging optics, which are fastened on the holding device and which comprise a spectacle lens as claimed in claim 1,
wherein the image that is generated is generated such that the user can perceive the image as a virtual image.

10. A method for producing the spectacle lens as claimed in claim 1, comprising:
determining different ametropia ranges by a respective range of aberrations to be corrected;
calculating for each of the different ametropia ranges a curvature profile of the exit section;
determining the ametropia range in which the aberration value lies for the spectacle lens to be produced;
calculating the curvature profile of the rear side of the spectacle lens to be produced by selecting the exit section corresponding to the ametropia range that was determined and keeping constant and not changing the curvature profile of the selected exit section during the calculation of the curvature profile of the rear side; and
producing the spectacle lens on the basis of the calculated curvature profile of the rear side.

* * * * *